United States Patent [19]

King et al.

[11] 4,244,698

[45] Jan. 13, 1981

[54] METHOD FOR DRYING MAGNESIUM SULFATE

[75] Inventors: Robert J. King, Homewood, Ill.; Herbert A. Johnson, Midland, Mich.

[73] Assignee: The Dow Chemical Company, Midland, Mich.

[21] Appl. No.: 902,135

[22] Filed: May 2, 1978

[51] Int. Cl.³ .................... B01D 43/00; C22B 1/16; F26B 3/08

[52] U.S. Cl. .................... 23/313 FB; 34/10; 34/15; 34/28

[58] Field of Search ............ 23/313 FB; 423/554, 423/DIG. 16; 34/10, 15, 25, 28, 46, 57 A; 165/3, 104 F; 432/15, 58

[56] References Cited

U.S. PATENT DOCUMENTS

| | | | |
|---|---|---|---|
| 3,401,216 | 9/1968 | Coletta | 23/313 FB |
| 3,638,328 | 2/1972 | Soli | 34/10 |
| 3,748,103 | 7/1973 | Bean et al. | 23/313 FB |
| 4,005,987 | 2/1977 | Jury | 23/313 FB |
| 4,083,198 | 4/1978 | Erneta | 34/10 |

OTHER PUBLICATIONS

"Chem. Eng. Handbook", Perry et al., 5th Ed.; McGraw-Hill, pp. 20-67→20-74, 1973.
"Ind. & Eng. Chem.", 55, pp. 18-24, Quinn, 1963.
"Chem. Eng.", pp. 177-184, 3-13-67, Clark.
Nonhebel et al., "Drying . . . ", Ch. 11–Fluidized Bed Dryers, pp. 205-220 & 295 & 296, CRC Press, 1971.
Vanecek et al., "Fluidized Bed Drying", pp. 5-7, 16-21, 33-45, 154 & 155 & 186-191, Leonard Hill Books, 1966.

*Primary Examiner*—Bradley R. Garris
*Attorney, Agent, or Firm*—J. M. Kuszaj

[57] ABSTRACT

A method of drying hydrated crystalline magnesium sulfate to reduce its surface moisture content is disclosed. The method comprises: (a) fluidizing a bed of hydrated crystalline magnesium sulfate particles by continuously passing a heated gaseous medium in a generally upwardly direction through the particles at a superficial velocity at least sufficient to maintain turbulent fluidization and mixing of the particles throughout the bed; (b) transferring a dispersed form of hydrated crystalline magnesium sulfate to be dried into the fluidized bed; (c) maintaining the amount of crystalline magnesium sulfate within the fluidized bed at a constant depth; (d) controlling the temperature and relative humidity of the heated gaseous medium to maintain a bed temperature and humidity sufficient to vaporize at least a portion of the surface moisture from the hydrated crystalline magnesium sulfate without removing waters of hydration; and (e) removing dried hydrated crystalline magnesium sulfate from the bed.

17 Claims, 1 Drawing Figure

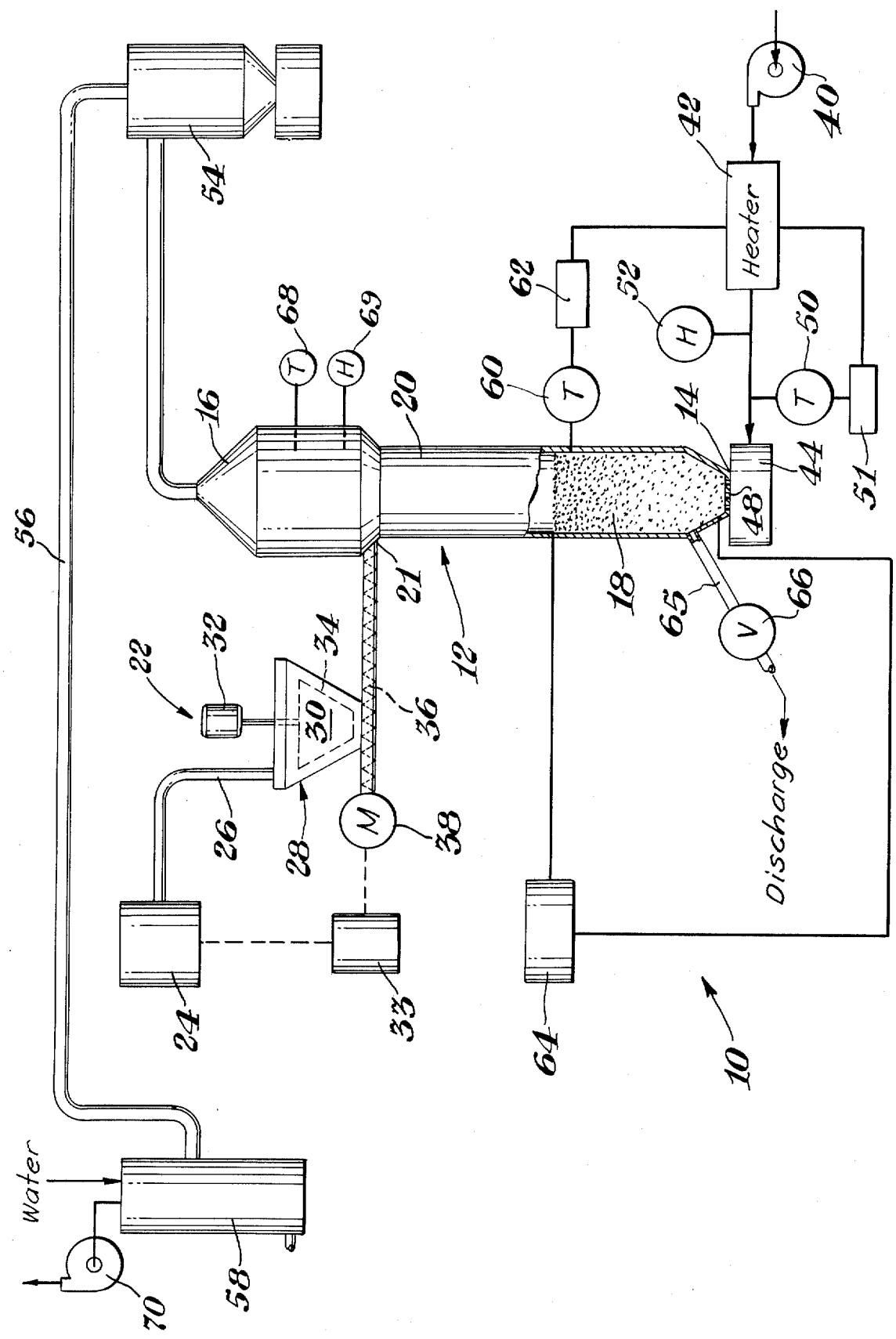

METHOD FOR DRYING MAGNESIUM SULFATE

BACKGROUND OF THE INVENTION

The present invention relates generally to a method of drying crystalline material. More in particular, the present invention relates to a fluidized method for drying hydrated crystalline magnesium sulfate.

In drying hydrated crystalline magnesium sulfate, particularly Epsom salt ($MgSO_4.7H_2O$), it is desirable to remove moisture from the surface of the crystalline material without removing waters of hydration. It is well known that surface moisture can be removed from hydrated crystalline salts by the use of a continuous rotary dryer. The operation and design of such a dryer are described in detail by R. H. Perry and C. H. Chilton, in *Chemical Engineers' Handbook*, 5th ed., McGraw-Hill Book Co., New York, N.Y., (1973), pp 20–30 through 20–45.

While such conventional rotary dryers can, in some situations, be satisfactory for drying, they suffer from a number of disadvantages. For example, rotary dryers consume large amounts of energy and can be thermally inefficient. Moreover, they can cause excessive particle size degradation.

Many of the disadvantages associated with conventional rotary dryers can be overcome by utilizing fluidized bed technology. The general properties and advantages of fluidized systems are well known. They are described, for example, by R. H. Perry and C. H. Chilton, in *Chemical Engineers' Handbook*, 5th ed., McGraw-Hill Book Co., New York, N.Y., 1973, pp 20–67 through 20–74. Most of the applications of fluidized bed technology have been to catalytic systems, calcining, or bulk drying of materials such as sand and coal, rather than to drying chemical compounds.

The theory and practice of fluidized bed dryers for chemical compounds are not well established. Information is scanty on the design and performance of fluidized systems for the thorough drying of conventional chemical compounds. (G. Nonhebel and A. A. H. Moss, "Drying of Solids in the Chemical Industry", CRC Press, Cleveland, Ohio, (1971) pp 205/210). As a result, it is not even generally known which materials may be dried successfully in a fluidized system and which may not. (V. Vanecek, M. Markvart, and R. Drbohlav, *"Fluidized Bed Drying"*, Leonard Hill Ltd., London (1966), p. 7).

Surveys of the materials which are known to have been successfully dried in fluidized bed dryers are reported in "Fluidized Bed Drying", ibid, at pp 145–155, and in "Drying of Solids in the Chemical Industry", ibid, at p. 211. However, crystalline material containing both waters of hydration and a small amount of surface moisture, has not heretofore been dried in a fluidized bed dryer to selectively remove only the surface moisture content from the material. Moreover, it would be unexpected that such selective dehydration of crystalline magnesium sulfate would be possible in a fluidized system, since it is commonly thought that moist crystalline material which tends to agglomerate cannot be processed in a fluidized system.

SUMMARY OF THE INVENTION

It has now surprisingly been discovered that hydrated crystalline magnesium sulfate can be effectively dried in a fluidized bed. At least a portion, and preferably, substantially all of the surface moisture can be removed from the hydrated material without removing waters of hydration by controlling the fluidization process. Moreover, the present fluidized method possesses significant advantages over the conventional rotary drying method. First, the heat required per pound of water vaporized in the present method is about 40 percent less than that required in the rotary drying method. Second, the breakage of crystals in the present method is about 25 percent less than in the rotary drying method. Finally, the amount of agglomerated crystals produced by the fluidized method is almost 100 percent less than crystals produced by the conventional rotary drying method.

The method of the present invention comprises fluidizing a bed of hydrated crystalline magnesium sulfate particles by continuously passing a heated gaseous medium in a generally upwardly direction through the particles. The gaseous medium is passed at a superficial velocity at least sufficient to maintain turbulent fluidization and mixing of the particles throughout the bed. Hydrated crystalline magnesium sulfate to be dried is transferred in a dispersed form into the fluidized bed. The total amount of crystalline magnesium sulfate within the fluidized bed is maintained at a constant depth. The temperature and relative humidity of the heated gaseous medium are controlled to maintain a fluidized bed temperature and humidity sufficient to vaporize at least a portion of the surface moisture from the hydrated crystalline magnesiusium sulfate without removing waters of hydration. The dried hydrated crystalline magnesium sulfate is then removed from the fluidized bed.

"Turbulent fluidization" is defined with reference to the manner in which a mass of finely divided particles is transformed into a fluidized bed by the lifting action of a gaseous medium. The velocity of the gaseous medium is measured on the basis of the rate of flow through an empty column, and is frequently referred to as the "superficial velocity". At very low superficial velocities, the gaseous medium percolates through the mass of particles without agitating the individual particles. Under these conditions, the pressure drop across the bed increases linearly with velocity, but is less than the weight of the bed. When the superficial velocity of the gaseous medium is increased sufficiently, the pressure drop becomes equal to or slightly in excess of the weight of particles present. At this point, the particles are suspended in the gaseous medium and the bed is fluidized. When the superficial velocity of the gaseous medium is increased only slightly above that required for incipient fluidization, there results a "quiescent" fluidized bed, in which the particles display little or no mixing. As the superficial velocity of the gaseous medium is increased further, the bed expands and the particles tend to mix almost instantaneously upon introduction. This state is referred to herein as "turbulent fluidization".

BRIEF DESCRIPTION OF THE DRAWING

The single FIGURE shown in the drawing is a schematic representation of one embodiment of a fluidized bed drying system useful in the practice of the present invention.

DETAILED DESCRIPTION OF THE INVENTION

In the illustrated embodiment of the invention, there is depicted a fluidized bed drying system generally designated by the reference numeral 10. The system 10 includes a vertically disposed column 12. Positioned at the bottom of column 12 is a gas inlet 14 for introducing a gaseous medium into the interior of column 12. An exhaust gas outlet 16 for venting the gaseous medium is positioned at or near the top of column 12. A gas distribution plate 48 is positioned across the interior cross-sectional area of column 12 at the gas inlet end 14. Above plate 48, in the interior of column 12, is a bed 18 of crystalline magnesium sulfate particles of predetermined depth. Extending from the top of bed 18 to the exhaust gas outlet 16 is that portion 20 of column 12 not occupied by the fluidized bed. This portion is commonly termed the disengaging region 20.

A feed supply means, generally designated by the reference numeral 22, is located in a spaced relationship adjacent to column 12. The feed supply means is in fluid communication with the disengaging region 20 by suitable means such as feed inlet 21. The feed supply means 22 includes a feed source 24, with an outlet end 26 communicating with a feed reservoir 28. The feed reservoir 28 includes agitation means such as an interior agitator 30 powered by a motor 32. The agitation means is adapted to minimize the build-up of feed material around the inside walls of the feed reservoir 28. In the illustrated embodiment, the agitator 30 is constructed so that its edges 34 come as close to the walls of the feed reservoir 28 as possible (not shown). A strip of flexible material such as rubber (not shown) is preferably attached to outer edges 34 of agitator 30. The flexible material contacts the interior surface of feed reservoir 28 with sufficient pressure to prevent a build-up of material around the interior surface.

The bottom portion of feed reservoir 28 communicates with a feed conveying means such as screw feed 36 powered by motor 38. In the illustrated embodiment, the agitator 30 extends downward as close to screw feed 36 as possible. This arrangement minimizes bridging of moist crystalline material above the screw feed inlet at the bottom of feed reservoir 28. The screw feed 36 is preferably of the double screw type (not shown). Moreover, the screw feed 36 preferably has means for breaking up agglomerated feed material. For example, in a preferred embodiment, an X-shaped piece of metal (not shown) can be attached to the discharged end of screw feed 36 at inlet 21. This X-shaped piece of metal rotates with the screw to break up oversized clumps of crystalline material prior to introduction into column 12. The crosspiece rotates at the same speed as the screw, and is thus able to maintain its effectiveness at any feed rate. The combination of the agitation means with the means for breaking up agglomerated feed material insures that the crystalline material introduced into the fluidized bed is in a dispersed form (having an average size of less than about one-fourth inch) rather than agglomerated into larger masses.

Feed control means 33 can be connected to the feed source 24 or the screw feed motor 38 to monitor or control the rate at which the crystalline material to be dried is introduced into column 12. Suitable control means are well known and can include, for example, an automated control such as a digital computer.

The bed 18 of particles is fluidized in a conventional manner by passing air or another gaseous medium from a fan or blower 40 through a heating unit 42 into a wind box or plenum chamber 44. From the plenum chamber 44, the gaseous medium passes in a generally upwardly direction through gas distribution plate 48 and into bed 18.

The temperature of the gaseous medium entering plenum chamber 44 is monitored by conventional temperature-sensing means, such as thermocouple 50. The humidity of the gaseous medium is also monitored by conventional humidity-sensing means, such as humidistat 52. Thermocouple 50 communicates with a temperature controlling unit 51, which is capable of adjusting the temperature of heater 42.

The gaseous medium moves upwardly through bed 18 at a predetermined velocity and is discharged through the gas exhaust outlet 16 into a suitable dust collector, such as a cyclone separator 54. Within the cyclone separator 54, finely entrained hydrated crystalline magnesium sulfate particles are separated from the gaseous medium. Effluent gases then pass from the cyclone separator 54 through conduit 56 and are separated and cooled in a suitable device such as scrubber 58. If desired, a portion of the effluent gaseous medium can be recycled (not shown) to blower 40.

Scrubber 58 can utilize water to form a slurry of the solid particulate material remaining in the gaseous medium. The water entering such a scrubber exits as a slurry which can be conveyed to a filter or settler. Other well-known scrubbing techniques can also be used.

Optionally, a vacuum (for example, 1-2 inches of water) can be generated in the disengaging region 20. The resulting vacuum minimizes loss of solid material to the environment. The vacuum can be produced by conventional means, such as, by the use of an exhaust blower 70 communicating with the scrubber 58, conduit 56, and cyclone separator 54.

The temperature and humidity of the gaseous medium passing to cyclone separator 54 are monitored by conventional means, such as thermocouple 68 and humidistat 69.

The temperature of the bed 18 of particles is monitored by a suitable temperature sensing element, such as thermocouple 60. Thermocouple 60 communicates with a temperature control unit 62, which in turn communicates with and controls heater 42.

The depth of the bed 18 is monitored by a suitable bed monitoring device 64. In one embodiment, bed monitoring device 64 is a pressure sensing instrument having probes attached to the top and bottom portions of bed 18. In this configuration, the differential pressure across the bed is measured and utilized as an indication of bed depth.

A product discharge conduit 65 is positioned such that dried crystalline magnesium sulfate is continuously removed from the bottom of bed 18 above the gas distribution plate 48. Valve means 66 is connected to product discharge conduit 65 for controlling the rate at which dried crystalline magnesium sulfate is removed.

In the practice of the method of the present invention, the bed of hydrated crystalline magnesium sulfate particles is fluidized by continuously passing a heated gaseous medium in a generally upwardly direction through the particles. The gaseous medium is maintained at a superficial velocity at least sufficient to maintain turbulent fluidization and mixing of the particles throughout the bed.

The hydrated crystalline magnesium sulfate particles forming the bed are preferably of the same chemical composition as the material to be dried. For example, when magnesium sulfate heptahydrate (Epsom salt) is dried, the particles forming the fluidized bed are also magnesium sulfate heptahydrate. The size of both the hydrated crystalline magnesium sulfate particles in the bed and those particles to be dried can vary. However, particles distributed in size between about 3 mesh (U.S. Standard Series) and about 70 mesh are preferred because formation of large bubbles within the bed is minimized. Larger or smaller particles can be used if desired. However, larger particles cause instability and may result in slugging or massive surges within the bed. Smaller particles (less than about 70 mesh) frequently form undesirable aggregates or fissures within the bed. The hydrated crystalline magnesium sulfate particles employed are generally needle-shaped. However, other shapes, such as spherical particles, can be used if desired.

As is well known in the art, the optimum depth of the crystalline magnesium sulfate particles within the bed can vary. Where the column 12 has a diameter of from about 8 inches to about 8 feet, a bed depth of from about 15 to about 25 inches has been found to be suitable for drying hydrated crystalline magnesium sulfate. However, any bed depth which will insure adequate mixing of the bed and maximum moisture absorption by the gaseous medium can be used.

The bed 18 of particles is transformed into the fluidized state by the upward velocity of the gaseous medium passing through the gas distribution plate 48. The superficial velocity of the gaseous medium passing through particle bed 18 is at least sufficient to maintain turbulent fluidization and mixing of the particles throughout the bed. The minimum superficial velocity can be determined by measuring the differential pressure drop across a bed of particles of known depth as a function of the gas flow rate. For example, by measuring bed differential pressure changes with changes in gas flow rate for a 16 inch bed depth, the minimum velocity required for fluidization is found to be 0.4 foot per second (fps). At a superficial fluidization velocity of from about 0.4 to about 1 fps, the bed is in an unstable state of fluidization as shown by unstable differential pressure readings in that range. In this range the particles display little or no mixing. Turbulent fluidization and good mixing within the bed are observed at a superficial fluidization velocity of at least 2 fps. In order to minimize elutriation of a large fraction of the particles within the bed, a superficial air fluidization velocity of from about 3 to about 5 fps is preferred, and from about 3 to about 4 fps is more preferred.

The gaseous medium employed for fluidization is unreactive with the crystalline hydrated magnesium sulfate particles. Moreover, the gaseous medium is capable of undergoing substantial heat and mass transfer reactions with the surface moisture of the hydrated crystalline magnesium sulfate to be dried. Suitable gaseous medium can include air, oxygen, combustion gases, mixtures thereof, and the like. Atmospheric air is the preferred gaseous medium because it is readily available and requires no special handling or equipment.

The gaseous medium is heated to a predetermined temperature by any suitable technique. In one embodiment, a steam heating coil (not shown) is employed between the blower 40 and the plenum chamber 44, to effect the necessary heating. In other embodiments, an oil or gas furnace or electrical heater can be employed to heat the gaseous medium.

The temperature and relative humidity of the heated gaseous medium are controlled to maintain a bed temperature and humidity sufficient to vaporize at least a portion, and preferably substantially all, of the surface moisture from the hydrated crystalline magnesium sulfate without removing waters of hydration. For example, when magnesium sulfate heptahydrate is being dried, the temperature of the heated gaseous medium is controlled to maintain a constant bed temperature of less than about 48° C. Preferably, the temperature is controlled to maintain a bed temperature of from about 20° to about 45° C., and more preferably from about 40° to about 45° C. At temperatures above about 48° C., the heptahydrate dehydrates by losing a water of hydration. Preferably, the temperature and relative humidity of the gaseous medium are controlled so that the partial water vapor pressure in the gaseous medium is less than the water vapor pressure present at the surface of the hydrated crystalline magnesium sulfate. This allows the crystalline material to be dried by heat and mass transfer to the gaseous medium.

Once the desired fluidization within the bed 18 is attained, hydrated crystalline magnesium sulfate is introduced into the top portion of column 12 through feed supply means 22. Preferably, this hydrated crystalline magnesium sulfate contains less than about 10 percent by weight surface moisture. More preferably, the hydrated material to be dried contains from about 1 to about 6 percent by weight surface moisture, and most preferably from about 3 to about 6 percent by weight.

The total amount of hydrated crystalline magnesium sulfate maintained within the bed at any time is controlled to insure a constant bed depth, which can be monitored by techniques well known in the art. Preferably, this control is achieved by adjusting the rate of feed of crystals into column 12 from the feed supply means 22. The adjustment can be achieved by controlling the screw feed 36, the feed supply 34, or by other suitable means. The amount of hydrated crystalline magnesium sulfate contained within the bed can also be controlled by adjusting the rate of the discharge of dried material through discharge conduit 65 by means of valve 66 or other suitable regulating means. A coordinated adjustment of feed and discharge rates is also suitable for controlling the bed depth.

The crystalline magnesium sulfate is maintained within the fluidized bed for a sufficient time to remove substantially all surface moisture. The surface moisture content of the hydrated crystalline magnesium sulfate particles within the bed may be monitored by visual observation, suitable instrumentation, or EDTA titration. When substantially all surface moisture has been removed from the material, dried hydrated crystalline magnesium sulfate is removed from the bottom of the bed.

In conventional methods of drying hydrated crystalline magnesium sulfate, it would be expected that a continuously operating drying method such as the present fluidized method would generate a distribution of over-dried and under-dried material. Surprisingly, the rapid dispersion of feed crystal moisture achieved by the present method results in dried crystals of substantially uniform dryness.

A better understanding of the present invention may be obtained in light of the following Examples which are set forth to illustrate, and are not to be construed to limit, the present invention.

EXAMPLES

EXAMPLE 1

The fluidization column used was a vertically disposed, substantially cylindrical column about 8 inches in inside diameter and about 8 feet in length. The column was constructed from Monel ® brand metal alloy. The lower end of the column was tapered inwardly and had a gas distribution plate having ⅛ inch holes on ½ inch centers positioned near the bottom of the tapered portion. The upper end of the column was closed and had a gas exhaust line attached thereto. The interior of the column contained a bed of heptahydrated neddle-like magnesium sulfate crystals about 16 inches deep when fluidized. The disengaging region above the bed was approximately 6 feet in length.

Air was introduced into the bottom of the column through the plenum chamber at an air flow rate of about 54 standard cubic feet per minute (SCFM). The superficial air velocity was 2.7 fps. The inlet air was at a temperature of about 120° C. and had a dew point of 20°–30° F. Within the column the temperature of the bed of particles was maintained at about 44° C. The pressure differential across the bed was measured by means of a manometer and was determined to be about 6.25 inches of $H_2O$.

Heptahydrated crystalline magnesium sulfate particles having a surface moisture content of about 5 percent by weight water were introduced into the top portion of the column by means of a screw feed. The particles were maintained within the heated fluidized bed for about 11 minutes and then removed from the bottom of the bed. Analysis by visual observation and EDTA titration of the product showed substantially all surface moisture had been removed. Chemical analysis indicated that no waters of hydration had been removed.

After drying, the hydrated crystalline magnesium sulfate was screened on a 14 mesh screen (U.S. Standard series). The ratio of material passing through the screen (MPT) to material retained on the screen (MR) was determined. A high MPT/MR ratio indicates an excess of small crystals in the product, and is undesirable in many end uses.

A summary of the operating conditions and results for Example 1 are shown in the Table.

EXAMPLES 2–16

Heptahydrated magnesium sulfate was dried substantially as described in Example 1, however, operating parameters were varied as shown in the Table.

COMPARATIVE DEMONSTRATION-A

Heptahydrated crystalline magnesium sulfate particles containing about 6.5 percent by weight surface moisture were dried by a conventional rotary dryer. The results are shown in the Table.

DISCUSSION OF THE EXAMPLES

A. Residency Time

In Examples 1–16, the water evaporation rate (parameter n) is directly proportional to the heat removed from the gaseous medium (parameter m). The direct proportionality demonstrates that the removal of surface moisture from the hydrated crystalline magnesium sulfate depends only on the heat transferred from the gaseous medium to the particles in the bed. Observations have demonstrated that the moisture entering the fluidized bed dryer on the surface of the hydrated cyrstalline magnesium sulfate is so rapidly dispersed throughout the bed by the gaseous medium that the distribution of the particles in the bed had an insignificant effect upon the moisture content of the final product. This is surprising since it is expected that due to the thorough intermixing involved in a fluidized bed, the times for drying individual particles would not be equal, and that under-dried as well as over-dried particles would leave the fluidized dryer, and undersized as well as oversized particles would appear in the fluidized bed discharge.

B. Advantages of Present Invention over Conventional Process

A comparison of the present process with the conventional rotary drying operation clearly illustrated some of the advantages offered by the present invention. First, the heat required per pound of water evaporated in the present process was about 40 percent less than that required in a conventional rotary dryer. Second, the breakage of crystals in the present invention was about 25 percent less than in a rotary dryer as evidenced by the ratio of MPT to MR (parameter r). Third, the present process produced fewer oversized masses of crystals. The amount of material having a particle size less than about 14 mesh was 0.3 percent or less of the product as compared with up to 5 percent for conventional rotary dryers.

TABLE

Fluid Drying of Magnesium Sulfate Heptahydrate

| Parameters | | 1 | 2 | 3 | 4 | 5 | 6 | 7 | 8 | 9 | 10 | 11 | 12 | 13 | 14 | 15 | 16 | Comparative A |
|---|---|---|---|---|---|---|---|---|---|---|---|---|---|---|---|---|---|---|
| a. | Feed Surface Water (%) | 5 | 5 | 5 | 5 | 5 | 5 | 4 | 5 | 4 | 5 | 5 | 4 | 4 | 4 | 4 | 6 | 6.5 |
| b. | Gas Flow (SCFM) | 54 | 83 | 108 | 54 | 65 | 75 | 43 | 54 | 54 | 65 | 65 | 86 | 86 | 86 | 86 | 86 | 26,700 |
| c. | Superficial velocity (fps @ bed temp.) | 2.7 | 4.0 | 5.3 | 2.6 | 3.2 | 3.85 | 2.2 | 2.8 | 2.6 | 3.2 | 3.2 | 4.1 | 4.1 | 4.1 | 4.1 | 4.1 | — |
| d. | Inlet Gas Temperature (°C.) | 120 | 55 | 55 | 55 | 75 | 112 | 112 | 170 | 69 | 68 | 68 | 51 | 51 | 50 | 57 | 57 | — |
| e. | Inlet Gas Dew Point (°F.) | 20–30 | 20–30 | 50–65 | 50–65 | 50–60 | 50–60 | 20–30 | 30–40 | 64 | 38 | 58 | 68 | 74 | 73 | 73 | 58 | 120 |
| f. | Differential Pressure Across Bed (inches H₂O) | 6.25 | 9.0 | 11.5 | 7.5 | 17 | 8.25 | 5.75 | 6.25 | 8.0 | 8.5 | 8.5 | 10.75 | 10.75 | 10.75 | 10.75 | 10.75 | — |
| g. | Differential Pressure Across Cyclone (inches of H₂O) | .5 | 1.0 | 1.5 | .5 | .75 | .75 | .5 | .5 | .5 | .75 | .75 | 1.0 | 1.0 | 1.0 | 1.0 | 1.0 | — |
| h. | Bed Temperature (°C.) | 44 | 28 | 34 | 33 | 39 | 48 | 45 | 49 | 34 | 41 | 36 | 32.5 | 35.5 | 37 | 39 | 38 | — |
| i. | Bed Contents (lb) | 20 | 20 | 20 | 20 | 20 | 20 | 20 | 20 | 20 | 20 | 20 | 20 | 20 | 20 | 20 | 20 | — |
| j. | Exit Gas Dew Point (°F.) | — | — | — | — | — | — | — | — | — | — | — | 68 | 73 | 77.5 | 80.5 | 79 | — |
| k. | Residence Time (min) | 11 | 25 | 29 | 33 | 22 | 10 | 14 | 6.6 | 23 | 27 | 20 | 25 | 38 | 51 | 25 | 44 | ~120 |
| l. | Heat Added to Gaseous Medium (Btu/hr-ft²) | 30,765 | 14,931 | 15,690 | 9,713 | 19,490 | 39,129 | 22,430 | 46,954 | 14,246 | 16,759 | 16,759 | 13,470 | 12,951 | 16,582 | 16,582 | — | — |
| m. | Heat Removed from Gaseous Medium (Btu/hr-ft²) | 24,613 | — | — | — | 14,421 | 28,785 | 17,275 | 39,183 | 11,332 | 12,083 | 14,034 | 9,584 | 8,029 | 6,734 | 9,327 | 9,842 | — |
| n. | Water Evaporation Rate (lb H₂O/hr-ft²) | 16.0 | — | — | — | 8.25 | 19.0 | 10.4 | 27.2 | 6.3 | 6.8 | 9.5 | 5.7 | 3.7 | 2.8 | 5.6 | 4.9 | — |
| o. | Heat Consumption (Btu/lb H₂O-Evap.) | 1,923 | — | — | — | 2,362 | 2,059 | 2,157 | 1,726 | 2,261 | 2,464 | 1,764 | 2,363 | 3,640 | 4,625 | 2,961 | 3,384 | 3,880 |
| p. | Dust Collected in Cyclone (% of Product) | .12 | 5 | 14 | .27 | 3.5 | 4.3 | .03 | .08 | .23 | .5 | .5 | — | — | — | — | — | — |
| q. | MgSO₄ in Scrubber Effluent (ppm)/(lb MgSO₄/hr) | — | 149/.006 | 185/.015 | 160/.009 | —/1.5 | —/1.0 | 140.004/1.1 | —/1.1 | —/1.0 | —/2.5 | —/3.1 | — | — | — | — | — | — |
| r. | MPT/MR Ratio | 1.4 | 1.6 | 1.5 | 1.3 | 1.5 | 1.0 | 1.1 | 1.1 | 1.0 | 2.5 | 3.1 | — | — | — | — | — | 5.7 |

What is claimed is:

1. A method of drying hydrated crystalline magnesium sulfate to reduce its surface moisture content comprising:
   (a) fluidizing a bed of hydrated crystalline magnesium sulfate particles by continuously passing a heated gaseous medium in a generally upwardly direction through the particles at a superficial velocity at least sufficient to maintain turbulent fluidization and mixing of the particles throughout the bed;
   (b) transferring hydrated crystalline magnesium sulfate to be dried into the bed of particles from a crystal feeding means, said magnesium sulfate to be dried being in a dispersed form;
   (c) controlling the amount of hydrated crystalline magnesium sulfate within the bed to maintain a constant bed depth;
   (d) controlling the temperature and relative humidity of the heated gaseous medium to maintain a bed temperature and humidity sufficient to vaporize at least a portion of the surface moisture from the hydrated crystalline magnesium sulfate without removing waters of hydration; and
   (e) removing dried hydrated crystalline magnesium sulfate from the bed.

2. The method of claim 1 wherein the temperature and relative humidity of the gaseous medium are controlled to maintain a partial water vapor pressure in the gaseous medium less than the water vapor pressure present at the surface of the hydrated crystalline magnesium sulfate within the bed.

3. The method of claim 1 wherein the gaseous medium is air.

4. The method of claim 1 wherein the superficial velocity is at least 2 foot per second.

5. The method of claim 1 wherein the superficial velocity is from about 3 to about 5 feet per second.

6. The method of claim 1 wherein the superficial velocity is from about 3 to about 4 feet per second.

7. The method of claim 1 wherein substantially all the surface moisture is vaporized without removing waters of hydration.

8. The method of claim 1 wherein the temperature of the heated gaseous medium is controlled to maintain a bed temperature of less than about 48° C.

9. The method of claim 1 wherein the temperature of the heated gaseous medium is controlled to maintain a bed temperature of from about 20° to about 45° C.

10. The method of claim 1 wherein the temperature of the heated gaseous medium is controlled to maintain a bed temperature of from about 40° to about 45° C.

11. The method of claim 1 wherein the hydrated crystalline magnesium sulfate to be dried has a surface moisture content of less than about 10 percent by weight water.

12. The method of claim 11 wherein the hydrated crystalline magnesium sulfate to be dried has a surface moisture content of from about 3 to about 6 percent by weight water.

13. The method of claim 1 wherein the magnesium sulfate to be dried has a particle size of about 3 to about 70 mesh.

14. The method of claim 13 wherein the hydrated crystalline magnesium sulfate removed from the bed is substantially uniformly dried.

15. The method of claim 1 wherein the magnesium sulfate is magnesium sulfate heptahydrate.

16. The method of claim 8 wherein the magnesium sulfate is magnesium sulfate heptahydrate.

17. The method of claim 13 wherein the magnesium sulfate is magnesium sulfate heptahydrate.

* * * * *

UNITED STATES PATENT AND TRADEMARK OFFICE
CERTIFICATE OF CORRECTION

PATENT NO. : 4,244,698

DATED : January 13, 1981

INVENTOR(S) : Robert J. King and Herbert A. Johnson

It is certified that error appears in the above—identified patent and that said Letters Patent is hereby corrected as shown below:

Col. 2, line 31, delete "magnesiusium" and insert --magnesium--.

Col. 8, lines 24 and 25, delete "cyrstalline" and insert --crystalline--.

In the Table at Col. 9, under "Item e", please make the following corrections:

Col. 5, delete "50-60" and insert --50-65--.
Col. 7, delete "20-30" and insert --50-60--.
Col. 8, delete "30-40" and insert --20-30--.
Col. 9, delete "64" and insert --30-40--.
Col. 10, delete "38" and insert --64--.
Col. 11, delete "58" and insert --38--.
Col. 12, delete "68" and insert --58--.
Col. 13, delete "74" and insert --68--.
Col. 14, delete "73" and insert --74--.
Col. 16, delete "58" and insert --73--.
Comparative A column, insert --58--.

UNITED STATES PATENT AND TRADEMARK OFFICE
CERTIFICATE OF CORRECTION

PATENT NO. : 4,244,698

DATED : January 13, 1981

INVENTOR(S) : Robert J. King and Herbert A. Johnson

It is certified that error appears in the above—identified patent and that said Letters Patent is hereby corrected as shown below:

In the Table at Col. 9, under "Item 1", please make the following corrections:

Col. 13, delete "12,951" and insert --13,470--.

Col. 14, delete "16,582" and insert --12,951--.

Col. 16, insert --16,582--.

Comparative A column, insert a dash -- - --.

In the Table at Col. 9, under "Item q", under Col. 7, delete "140.004" and insert --140/.004--.

Signed and Sealed this

Twenty-sixth Day of May 1981

[SEAL]

Attest:

RENE D. TEGTMEYER

Attesting Officer

Acting Commissioner of Patents and Trademarks